US012810253B2

(12) United States Patent
Halim

(10) Patent No.: US 12,810,253 B2
(45) Date of Patent: Nov. 24, 2026

(54) GENERATION AND MANAGEMENT OF COMMUNICATION WORKFLOWS USING TACIT WORKFLOWS

(71) Applicant: Twilio Inc., San Francisco, CA (US)

(72) Inventor: Fawad Halim, Addison, IL (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/758,820

(22) Filed: Jun. 28, 2024

(65) Prior Publication Data

US 2025/0217773 A1 Jul. 3, 2025

Related U.S. Application Data

(63) Continuation-in-part of application No. 18/400,924, filed on Dec. 29, 2023.

(51) Int. Cl.
*G06Q 10/1093* (2023.01)
*G06Q 10/0633* (2023.01)

(52) U.S. Cl.
CPC ..... *G06Q 10/1093* (2013.01); *G06Q 10/0633* (2013.01)

(58) Field of Classification Search
CPC ....................... G06Q 10/1093; G06Q 10/0633
USPC ........................................................ 705/7.27
See application file for complete search history.

(56) References Cited

U.S. PATENT DOCUMENTS

| | | | | |
|---|---|---|---|---|
| 2018/0018206 | A1* | 1/2018 | Stall | G06F 9/5022 |
| 2023/0031718 | A1 | 2/2023 | Popelka et al. | |
| 2023/0034999 | A1* | 2/2023 | Rodriguez | G06Q 10/107 |
| 2024/0004903 | A1* | 1/2024 | Balakrishnan | G06N 3/0464 |
| 2025/0219889 | A1 | 7/2025 | Dharaiya et al. | |

OTHER PUBLICATIONS

"Unlocking the Tacit Knowledge of Data Work in Machine Learning" Published by ACM Digital Library (Year: 2023).*
"U.S. Appl. No. 18/400,924, Non Final Office Action mailed Jun. 17, 2025", 19 pgs.
"U.S. Appl. No. 18/400,924, Examiner Interview Summary mailed Oct. 6, 2025", 2 pgs.
"U.S. Appl. No. 18/400,924, Response filed Oct. 16, 2025 to Non Final Office Action mailed Jun. 17, 2025", 13 pgs.

* cited by examiner

*Primary Examiner* — Zeina Elchanti
(74) *Attorney, Agent, or Firm* — Schwegman Lundberg & Woessner, P.A.

(57) ABSTRACT

Various embodiments described herein support or provide operations including detecting an event associated with an entity; mapping the event to a customer-defined workflow in a journey based on content of the event; generating a tacit workflow in the journey based on the mapping of the event; and processing the tacit workflow in accordance with the one or more steps.

20 Claims, 13 Drawing Sheets

GENERATION AND MANAGEMENT OF COMMUNICATION WORKFLOWS USING TACIT WORKFLOWS

CROSS REFERENCE TO RELATED APPLICATIONS

This patent application is a continuation-in-part of U.S. patent application Ser. No. 18/400,924, filed on Dec. 29, 2023, which is hereby incorporated by reference in its entirety.

TECHNICAL FIELD

Various embodiments described herein provide for systems, methods, techniques, instruction sequences, and devices that facilitate the generation and management of communication workflows using tacit workflows.

BACKGROUND

In the realm of digital communication, systems often grapple with the management and generation of workflows that automate interactions based on user activities and scheduled events. A primary challenge in this field is the effective processing of these user actions and events to ensure users are guided through the appropriate steps of communication workflows. Additionally, maintaining an accurate record of users' progress and status within these workflows presents a complex task, requiring precise coordination and tracking.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

DETAILED DESCRIPTION

Figure 1:
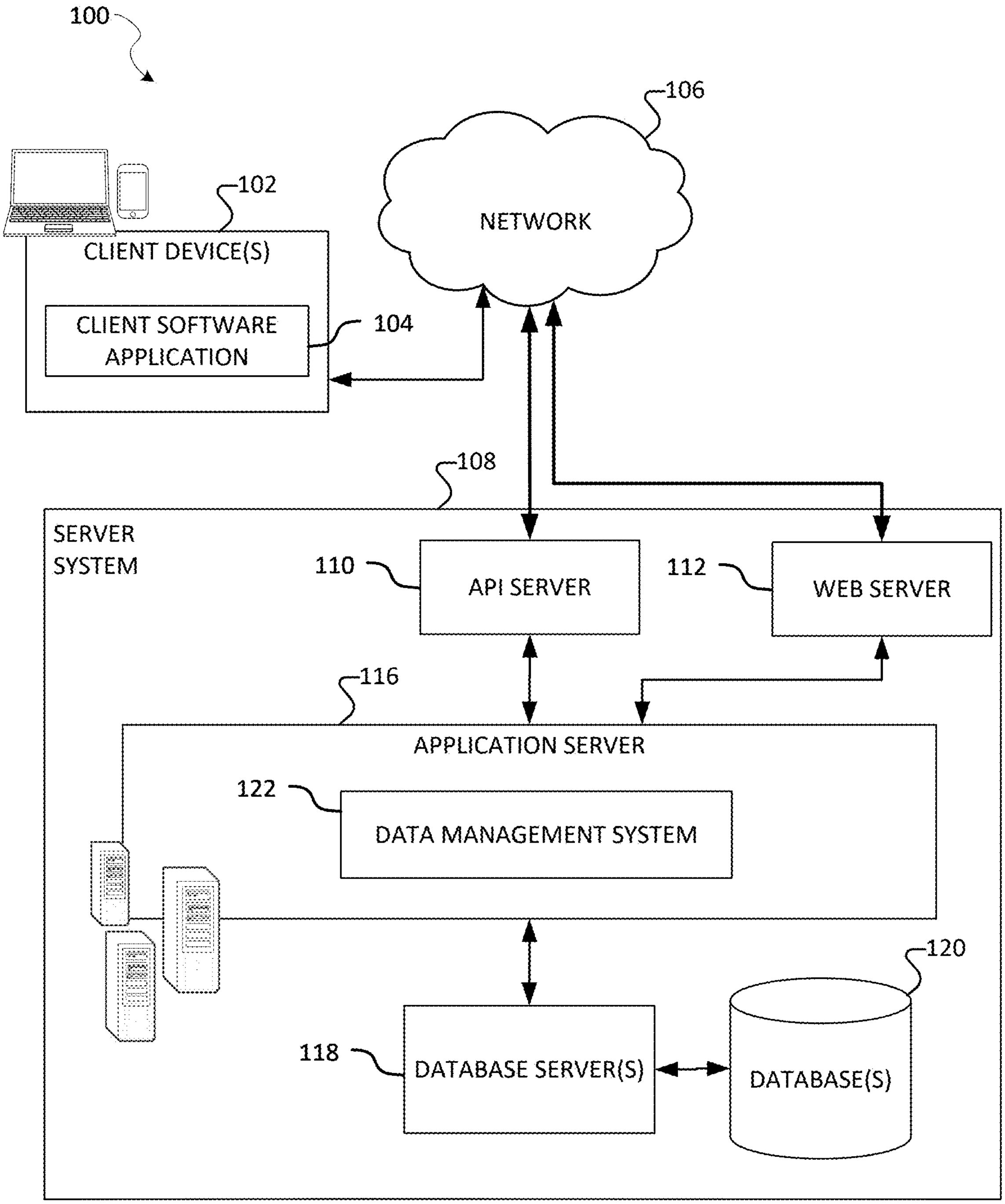
FIG. 1 is a block diagram showing an example data system that includes a data management system in an artificial intelligence system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter can be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations, and details are set forth in order to provide a thorough understanding of the present subject matter. However, it will be apparent to one of ordinary skill in the art that embodiments of the subject matter described can be practiced without the specific details presented herein, or in various combinations, as described herein. Furthermore, well-known features can be omitted or simplified in order not to obscure the described embodiments. Various embodiments may be given throughout this description. These are merely descriptions of specific embodiments. The scope or meaning of the claims is not limited to the embodiments given.

Tacit Workflows

Various embodiments include systems, methods, and non-transitory computer-readable media that facilitate generating and managing communication workflows using tacit workflows. Specifically, communication workflows refer to sequences of interactions and/or communication designed to engage with users. Various embodiments address the challenges of automating communications based on user actions and scheduled events, ensuring that users are directed through the correct steps of a communication workflow and that their progress is accurately tracked.

In various embodiments, a communication workflow can be configured by users (e.g., customer-defined workflows) through a user interface on a device or automatically generated by the system (e.g., tacit workflows) based on predefined settings (e.g., campaign setting). Communication workflows are part of a larger structure referred to as a journey, as a journey can include multiple communication workflows that run concurrently. Each step within a communication workflow is associated with specific actions and conditions. When these conditions are met, the corresponding actions are triggered.

In various embodiments, a journey can include one or more tacit workflows and one or more customer-defined workflows. Tacit workflows run concurrently with customer-defined workflows within a given journey but remain invisible to the user. They are automatically generated by the system based on predefined settings, such as campaign settings, to realize the tacit behavior associated with a customer-defined workflow in the same journey. An example of a tacit workflow is an exit flow. In a scenario involving an abandoned shopping cart, the exit flow for an item is generated (or initiated or activated) when the item is added to a shopping cart. The exit workflow is simultaneously generated to ensure an item in a shopping cart is purchased within a set timeframe while the main workflow is waiting for the timeout duration to elapse. If the item is purchased within a set timeframe, such as 7 days, the event of the purchase triggers an exit from the associated customer-defined workflow, regardless of the user's current position in the customer-defined workflow. This illustrates how tacit workflows can influence the behavior of the journey without direct user interaction.

In various embodiments, customers can create customer-defined workflows using an editor, such as the What You See Is What You Get (WYSIWYG) editor. This editor allows the creation of flows through a visual interface that includes nodes and edges, representing different steps and the transitions between them. Unlike tacit workflows, customer-defined workflows are visible to the user and can be customized directly according to the user's needs.

Various embodiments allow a user to be in one step of the customer-defined workflow at any given epoch. However, for effective tracking and management of the overarching workflow (e.g., a journey), a user can be involved in multiple steps within the associated tacit workflows. This dual engagement in both customer-defined and tacit workflows ensures that the system can react to exceptional scenarios within the journey, such as a rescheduled appointment or an abandoned cart, without requiring manual intervention from the user.

In various embodiments, a tacit workflow can be generated (or activated) to handle the case when an appointment is rescheduled. This workflow reacts to detection of a rescheduling event. This rescheduling event both resets the state of the customer-defined workflow within the same journey and becomes the input of the customer-defined workflow going forward. So if an appointment is rescheduled from April 30th to May 5th, the underlying plumbing (e.g., timers) for April 29th (1 day before April 30th) is discarded (or torn down) before restarting the flow for May 5th with similar resources set up for a May 4th email.

In various embodiments, the runtime is able to apply the same event to multiple steps in the event processing loop. In the rescheduling use case, if the rescheduling event is determined to be the same as the scheduling event except for the change of the duration to remind before an appointment, the event may be applied from the reset workflow into the customer-defined workflow, capturing the updated duration (d1aseconds) and using that in the customer-defined workflow as if it were the event initiating it at the time of the generation (or initiation).

Figure 9:
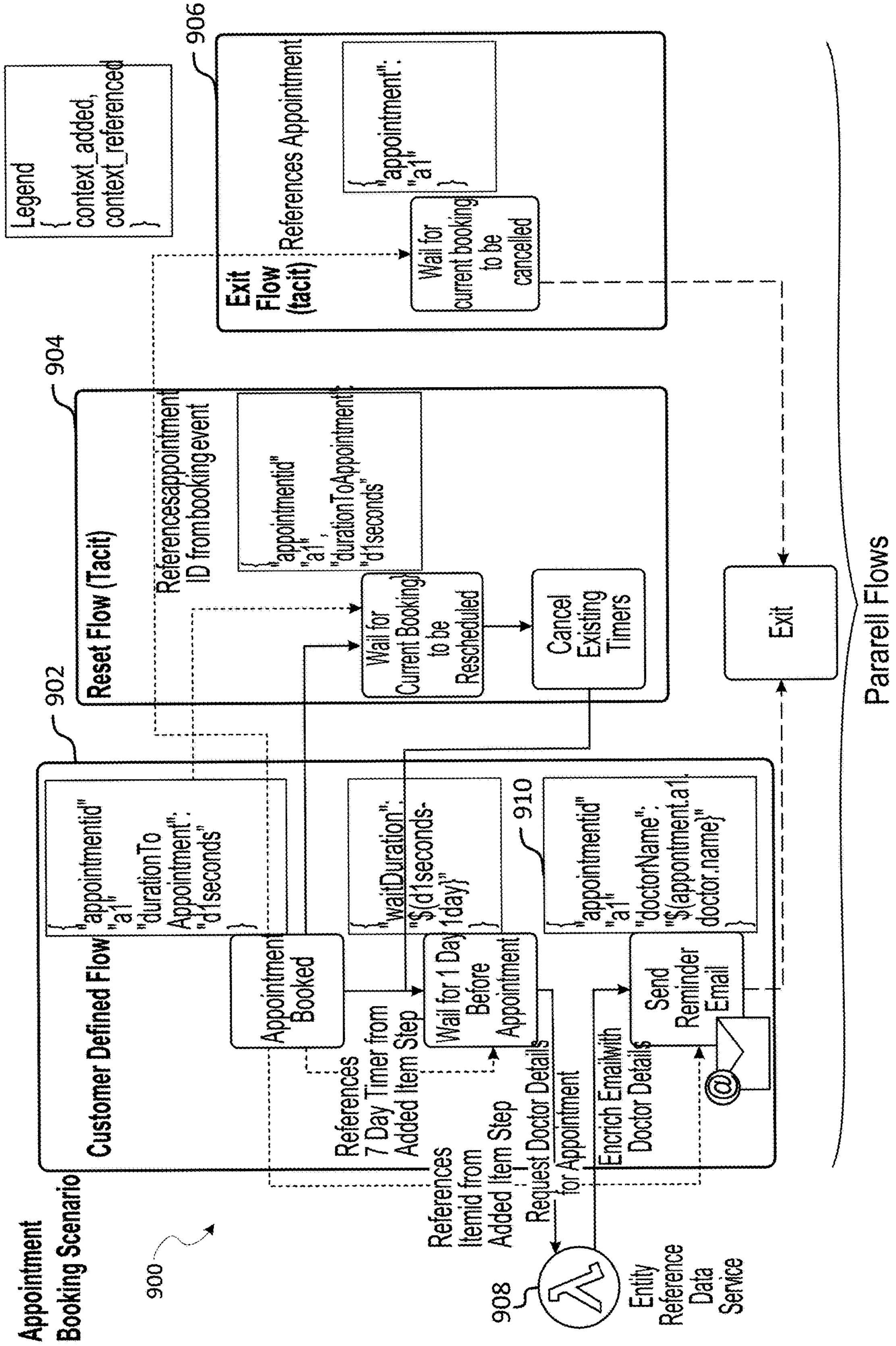
FIG. 9 is a block diagram illustrating example tacit workflows in an appointment booking scenario, according to various embodiments of the present disclosure.

In various embodiments, the system is able to call out to external systems (e.g., a Reference Data Service) and augment the context passed and updated between steps in a communication workflow. In a use case as illustrated in FIG. 9, the template interpolation syntax ${appointment.a1.doctor.name} is used to signal the fact that the name of the doctor associated with the appointment should be fetched from the system of record for subsequent use in an email template.

Overall, various embodiments provide a robust framework for managing communication workflows in a way that automates responses to user actions and scheduled events, tracks user progress through various steps, and reacts to exceptional scenarios within a journey. Various embodiments streamline the interaction process, making it more efficient and responsive to the dynamic nature of user engagement.

Event Filter and Profile State Consistency

Various embodiments include systems, methods, and non-transitory computer-readable media that facilitate generating and managing communication workflows using event filters. Specifically, communication workflows refer to sequences of interactions and/or communication designed to engage with users. A communication workflow can include one or more steps configured by a user via a user interface of a device. A journey can include one or more workflows. Each step of a communication workflow can be associated with one or more actions and one or more conditions that trigger the one or more actions. A communication workflow can be associated with metadata that is used to reference another step within the workflow, or reference one or more steps in another workflow. Various embodiments provide user-friendly interfaces to design and manage flows of interactions across various communication channels, such as SMS messages, voice calls, email, etc. Under this approach, users can automate interactions through predefined communication workflows to set up automated responses, reminders, and/or notifications based on user behavior and/or triggers. Further, various embodiments provide customized communication based on user actions and/or preferences to enhance the user experience, leading to higher conversion rates for various goals, including sales, user sign-ups, etc.

In various embodiments, an event filter filters incoming messages based on definitions of communication workflows and relays the qualified messages (also referred to as events or qualified events) to the corresponding state machines for downstream processing. Specifically, a data management system detects one or more events. Each event can include (or be associated with) a state object that indicates a state of a user and/or a state of an action associated with a user. The data management system uses one or more event filters to map the one or more events to one or more communication workflows based on the content of the one or more events. A journey can include one or more communication workflows. The mapping of the one or more events includes determining that the content of the one or more events satisfies the definitions of the journeys. In various embodiments, the data management system identifies a state machine associated with a journey. A state machine can refer to a computational model that represents different states of complex systems and/or communication processes and the transitions between those states based on certain events or conditions. A state machine can change (or transition) from one state to another in response to inputs. State machines can help manage communication workflows and provide a structured way to design, implement, and manage complex workflows by defining the possible states, the conditions triggering state transitions, and the actions to be taken in each state. For example, a state machine can be used to model various states (e.g., initiating call, ringing, connected, on hold, ended) of a call when building a phone call application using the example data system 100 described herein. Each of these states can be associated with actions, triggers, and conditions that determine how the call progresses from one state to another. Such a progression determination can be made based on user input, time limits, or events triggered by the data system described herein.

In various embodiments, the data management system uses a state machine to process an event (e.g., a filtered event) based on the associated state object in accordance with one or more steps defined for a journey. Filtered events can be saved in a log of events (e.g., Kafka topic) with a predetermined retention period (e.g., 24 hours).

In various embodiments, a single event (e.g., a filtered event) can be mapped to a plurality of journeys. The data management system can use one or more state machines to process one or more steps defined for each of the plurality of journeys.

In various embodiments, each step in a journey can be associated with metadata that is used to reference another step within the journey or a step in another journey. A state machine can be used to model a plurality of states associated with a user, a system, a communication workflow, etc.

In various embodiments, a journey can include one or more steps sequentially arranged in a logical order. A journey can allow a user to trigger an operation associated with a step of the journey once an operation associated with a previous step of the journey has been triggered. In various embodiments, a journey (also referred to as a communication workflow) can be configured and managed by a user via a user interface of a device.

In various embodiments, an event can be a system-generated event or a user-triggered event. In various embodiments, the data management system determines a current step in a journey that matches a user-triggered event. The data management system identifies a subsequent step from the journey based on the current step and uses a state machine to initiate an operation associated with the subsequent step based on the satisfaction of one or more conditions of the current step. The satisfaction of one or more conditions of the current step dictates how an entity progresses from the current step to the subsequent step. For example, a user-trigger event is detected and determined that the event is related to an action, such as a user abandoning a shopping cart. The data management system uses an event filter to map the event to a journey associated with the user. In accordance with the steps defined for the journey, the system determines the user's current step (e.g., checkout started) and one or more conditions to trigger a subsequent step. In this example, the user abandoning a shopping cart can be a condition to trigger a subsequent step (e.g., awaiting payments). Based on the determination, the data management system uses a state machine that handles the journey to initiate one or more actions associated with the subsequent step. An example of such an action can be transmitting one or more follow-up messages to the user with relevant product information.

In various embodiments, the data management system detects an event (e.g., a filtered event) associated with an entity (e.g., a user). Upon determining, based on the content of the event, that the event does not map to any definition (or any state machine) of a journey associated with the entity, the data management system generates a state machine based on the event. The generated state machine can model each step in the journey associated with the entity and handle one or more journeys to be configured by the entity. The handling of a journey can include initiating an operation associated with each step based on the current state of the entity.

In various embodiments, in order to map an event to a journey based on the content of the event, the data management system can use a software library to match a plurality of rules against the content of the event. The plurality of rules can be user-defined rules. The software library allows users to build applications that match a number of rules against events at a high processing speed (e.g., several hundred thousand events per second). Both events and rules can be JavaScript Object Notation (JSON) objects, but rules can additionally be expressed through an inbuilt query language that describes custom matching patterns.

A profile's (e.g., user profile) trip through a journey shall clearly define where a user is in a journey. At no point should a "profile and epoch" pair be simultaneously in multiple places (e.g., steps) in a given journey, or in a user-defined part of a given journey. In other words, each user can have one journey state (per user-defined concurrency criteria, for example), and each journey state can have one epoch at a time (for a given concurrency key). Epoch can be represented by an epoch object created upon entering a journey, and maintained until a user is deemed to have exited from the journey.

In various embodiments, upon determining that an event is mapped to a journey, the data management system places an entity (e.g., a user) in a current step in the journey based on a state object of the event (or a state object of the journey). The data management system evaluates one or more factors to determine that the entity is not simultaneously placed in another step of the journey. One or more factors can correspond to one or more of, without limitation, the evaluation of memberships, setting of evaluation windows, setting of priorities, existing entities, moving of profiles, and support analytics.

In various embodiments, in response to determining that the entity (e.g., user) is not simultaneously placed in another step of the journey, the data management system uses a state machine to process the event based on an operation associated with a step subsequent to the current step in the journey.

In various embodiments, the data management system updates a profile associated with a user based on the processing of the event.

In various embodiments, the data management system determines an event does not map to any journey associated with an entity (e.g., a user). Based on the determination, the data management system discards the event and/or passes the event to another system and/or component for processing.

In various embodiments, the data management system identifies one or more attributes (e.g., event properties) of an event (e.g., filtered event). Upon identifying a journey associated with the event, the data management system stores the one or more attributes of the event in the journey. Attributes of an event can include contextual data associated with the user profile, such as journey identifier, step identifier, timestamp data, etc.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a data management system (hereafter, the data management system 122, or system 122), according to various embodiments of the present disclosure. By including the data management system 122, the data system 100 can facilitate the generation and management of formatted content using machine learning technologies. As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the data management system 122 on the server system 108.

It will be appreciated that the location of certain functionality within the server system 108 is a design choice. For example, it may be technically preferable to initially deploy certain technology and functionality within the server system 108, but to later migrate this technology and functionality to the client software application 104.

The server system 108 supports various services and operations that are provided to the client software application 104 by the data management system 122. Such operations include transmitting data from the data management system 122 to the client software application 104, receiving data from the client software application 104 to the system 122, and the system 122 processing data generated by the client software application 104. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that may be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the data management system 122 of the application server 116.

The application server 116 hosts a number of applications and subsystems, including the data management system 122, which supports various functions and services with respect to various embodiments described herein. The application server 116 is communicatively coupled to a database server 118, which facilitates access to database(s) 120 that stores data associated with the data management system 122.

Figure 2:
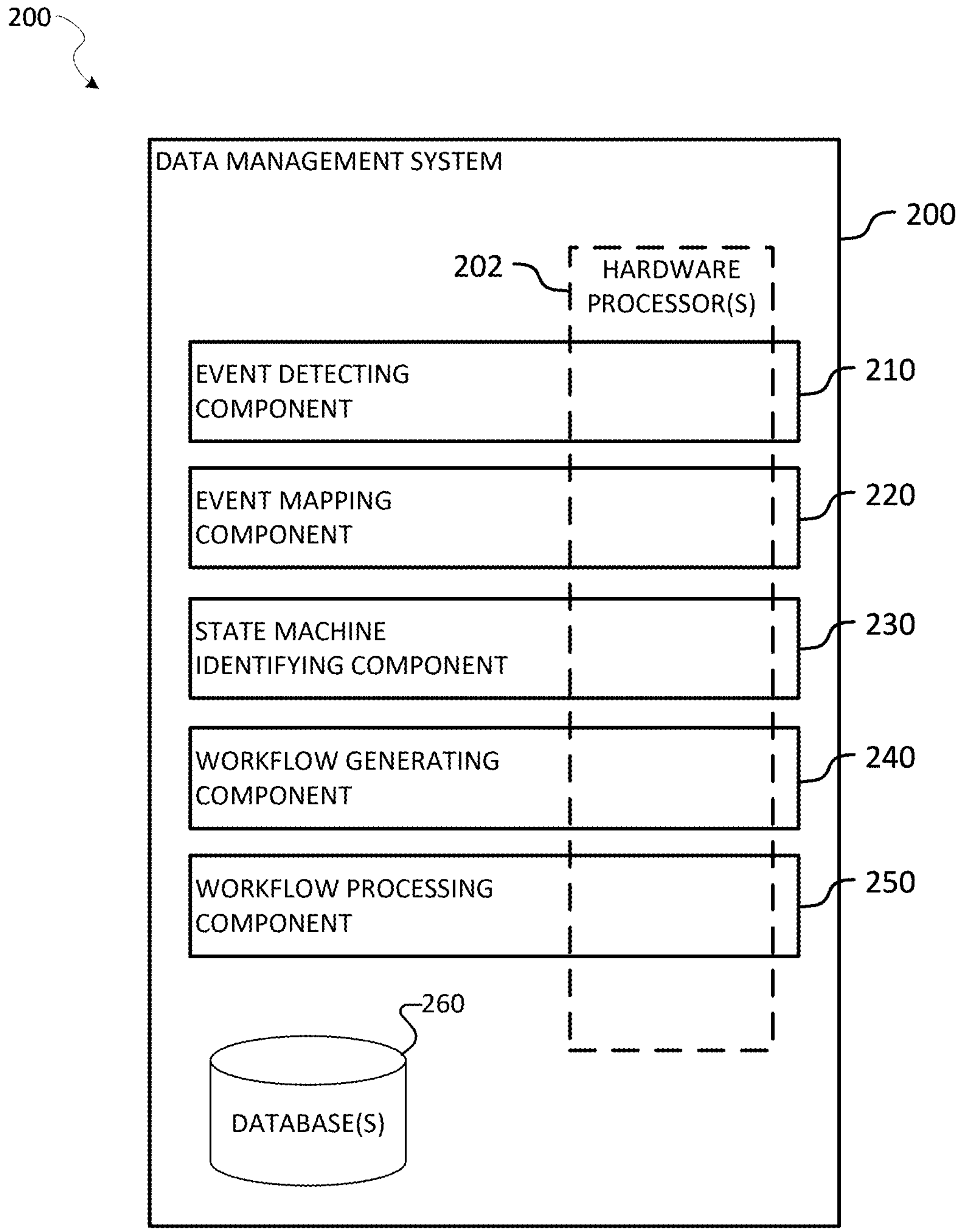
FIG. 2 is a block diagram illustrating an example data management system that facilitates the generation and management of communication workflows using tacit workflows, according to various embodiments of the present disclosure.

FIG. 2 is a block diagram illustrating an example data management system 200 that facilitates the generation and management of communication workflows using tacit workflows, according to various embodiments of the present disclosure. For some embodiments, the data management system 200 represents an example of the data management system 122 described with respect to FIG. 1. As shown, the data management system 200 comprises an event detecting component 210, an event mapping component 220, a state machine identifying component 230, a workflow generating component 240, and a workflow processing component 250. According to various embodiments, one or more of the event detecting component 210, the event mapping component 220, the state machine identifying component 230, the workflow generating component 240, and the workflow processing component 250 are implemented by one or more hardware processors 202. Data generated by one or more of the event detecting component 210, the event mapping component 220, the state machine identifying component 230, the workflow generating component 240, and the workflow processing component 250 can be stored in a database (e.g., database 260) of the data management system 200.

The event detecting component 210 is configured to detect one or more events associated with one or more entities (e.g., users). An event can include (or be associated with) a state object that indicates a state of a user and/or a state of an action associated with a user. An event can be a system-generated event or a user-triggered event.

The event mapping component 220 is configured to map one or more events to one or more communication workflows based on the content of the one or more events. A journey can include one or more workflows. The mapping of the one or more events includes determining that the content of the one or more events satisfies the definitions of the journeys.

The state machine identifying component 230 is configured to identify one or more state machines associated with one or more journeys. A state machine can refer to a computational model that represents different states of complex systems and/or communication processes and the transitions between those states based on certain events or conditions.

The workflow generating component 240 is configured to generate one or more communication workflows (e.g., customer-defined workflows, tacit workflows). A tacit workflow can be generated based on settings (e.g., campaign settings) associated with a journey or a customer-defined workflow in a journey.

The workflow processing component 250 is configured to use state machines to process one or more tacit workflows based on settings (e.g., campaign settings) associated with a journey or a customer-defined workflow in a journey. The workflow processing component 250 is configured to use state machines to process one or more customer-defined workflows based on definitions of one or more journeys.

Figure 3:
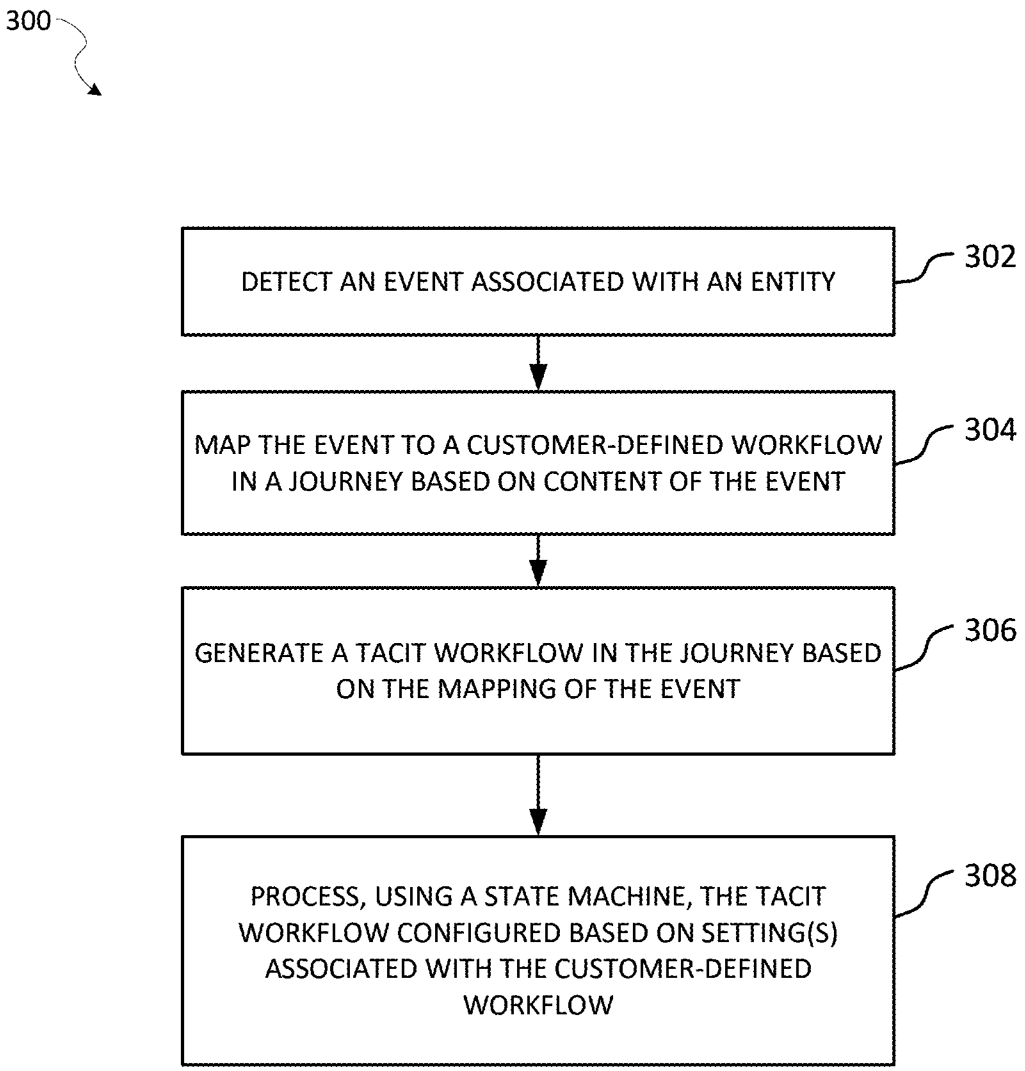
FIG. 3 is a flowchart illustrating an example method for facilitating the generation and management of communication workflows using tacit workflows, according to various embodiments of the present disclosure.

FIG. 3 is a flowchart illustrating an example method 300 for facilitating the generation and management of communication workflows using tacit workflows, according to various embodiments of the present disclosure. It will be understood that example methods described herein may be performed by a machine in accordance with some embodiments. For example, method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor detects one or more events. An event can be associated with an entity (e.g., a user) and can include (or be associated with) a state object that indicates a state of the user and/or a state of an action associated with the user. An event can be a system-generated event or a user-triggered event.

At operation 304, a processor maps one or more events to one or more communication workflows (e.g., customer-defined workflows) at least based on the content of the one or more events. The mapping of the one or more events includes determining that the content of the one or more events satisfies the definitions of a journey that includes the one or more communication workflows.

At operation 306, a processor generates a tacit workflow in the journey based on (or in response to) the mapping of the event. The tacit workflow includes one or more steps configured based on one or more settings (e.g., campaign) associated with the customer-defined workflow in the journey.

At operation 308, a processor uses a state machine identified for the journey to the tacit workflow in accordance with the one or more steps configured based on the one or more settings associated with the customer-defined workflow.

In various embodiments, the customer-defined workflow runs concurrently with the tacit workflow within the journey. A customer-defined workflow is configured by a customer associated with the entity or by the entity associated with the event. A tacit workflow is automatically generated by the system based on one or more settings (e.g., campaign) associated with the customer-defined workflow in the journey.

In various embodiments, a detected event can include contextual data that can be referenced by (and/or passed between) one or more steps in the customer-defined workflow and by one or more steps in the tacit workflow. Examples of contextual data include an item identifier, a timer identifier, an appointment identifier, and a time duration to remind before an appointment. In various embodiments, contextual data can be augmented via a call out to external systems (e.g., a Reference Data Service).

In various embodiments, upon (or in response to) determining that the content of an event satisfies a definition of a journey, a processor maps the event to the customer-defined workflow in the journey.

In various embodiments, a processor generates a tacit workflow based on contextual data (e.g., item identifier, timer identifier, appointment identifier, and duration to remind before an appointment) included in a detected event.

In various embodiments, a processor determines that the event does not correspond to a rescheduling event. In response to determining that the event is not the rescheduling event, a processor generates a tacit workflow (e.g., an exit workflow) in the journey based on one or more settings (e.g., campaign) associated with the customer-defined workflow in the journey.

In various embodiments, a processor identifies one or more state machines associated with one or more journeys. A state machine can refer to a computational model that represents different states of complex systems and/or communication processes and the transitions between those states based on certain events or conditions. State machines can help manage communication workflows and provide a structured way to design, implement, and manage complex workflows by defining the possible states, the conditions triggering state transitions, and the actions to be taken in each state.

In various embodiments, a processor uses one or more state machines to process one or more communication workflows (e.g., customer-defined workflow, exit workflow, reset workflow) based on one or more detected events described herein.

Though not illustrated, method 300 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 302 through 308 or, alternatively, form part of one or more of operations 302 through 308.

Figure 4:
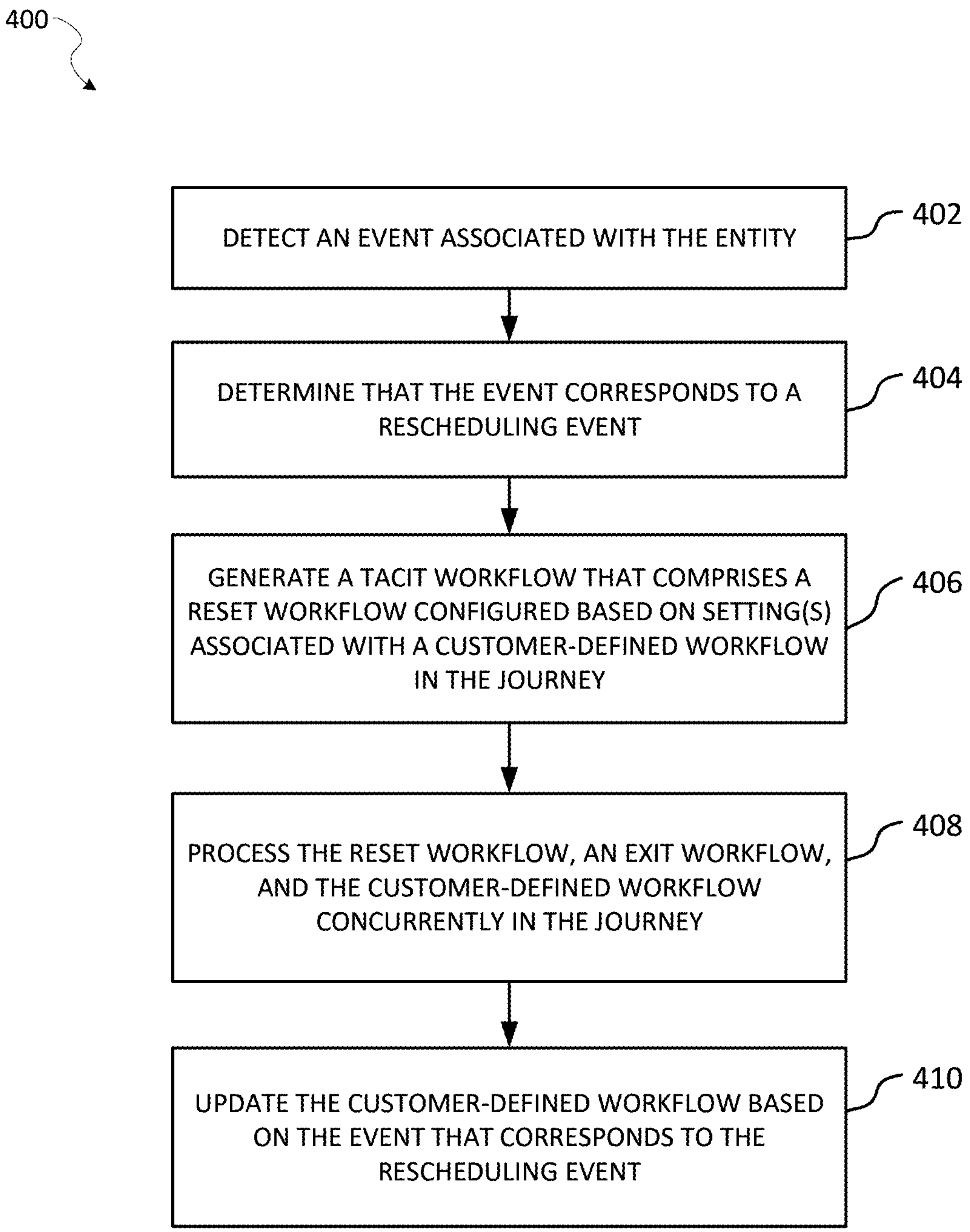
FIG. 4 is a flowchart illustrating an example method for facilitating the generation and management of communication workflows using tacit workflows, according to various embodiments of the present disclosure.

FIG. 4 is a flowchart illustrating an example method 400 for facilitating the generation and management of communication workflows using tacit workflows, according to various embodiments of the present disclosure. It will be understood that example methods described herein may be performed by a machine in accordance with some embodiments. For example, method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. The operations of method 400 can be executed independently (in series or in parallel) or dependently (in any given order) from the operations of method 300.

At operation 402, a processor detects an event (e.g., the second event) associated with an entity.

At operation 404, a processor determines that the event (e.g., the second event) corresponds to a rescheduling event and the first event corresponds to an appointment booking event.

At operation 406, a processor generates a tacit workflow (e.g., the second tacit workflow) that comprises (or corresponds to) a reset workflow. The reset workflow is configured based on one or more settings associated with the customer-defined workflow in the same journey.

At operation 408, a processor uses a state machine to concurrently process the reset workflow, an exit workflow, and the customer-defined workflow in the journey.

At operation 410, a processor updates the customer-defined workflow based on the event that corresponds to the rescheduling event. For example, if the rescheduling event (e.g., the second event) is determined to be the same as the scheduling event (e.g., the first event) except for the change of the duration to remind before an appointment, the rescheduling event may be applied from the reset workflow into the customer-defined workflow. Specifically, a processor captures the updated duration (e.g., d1a seconds) from the rescheduling event and applies the duration to the customer-defined workflow as if it were the event initiating it at the time of the generation.

Though not illustrated, method 400 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 402 through 410 or, alternatively, form part of one or more of operations 402 through 410.

Figure 5:
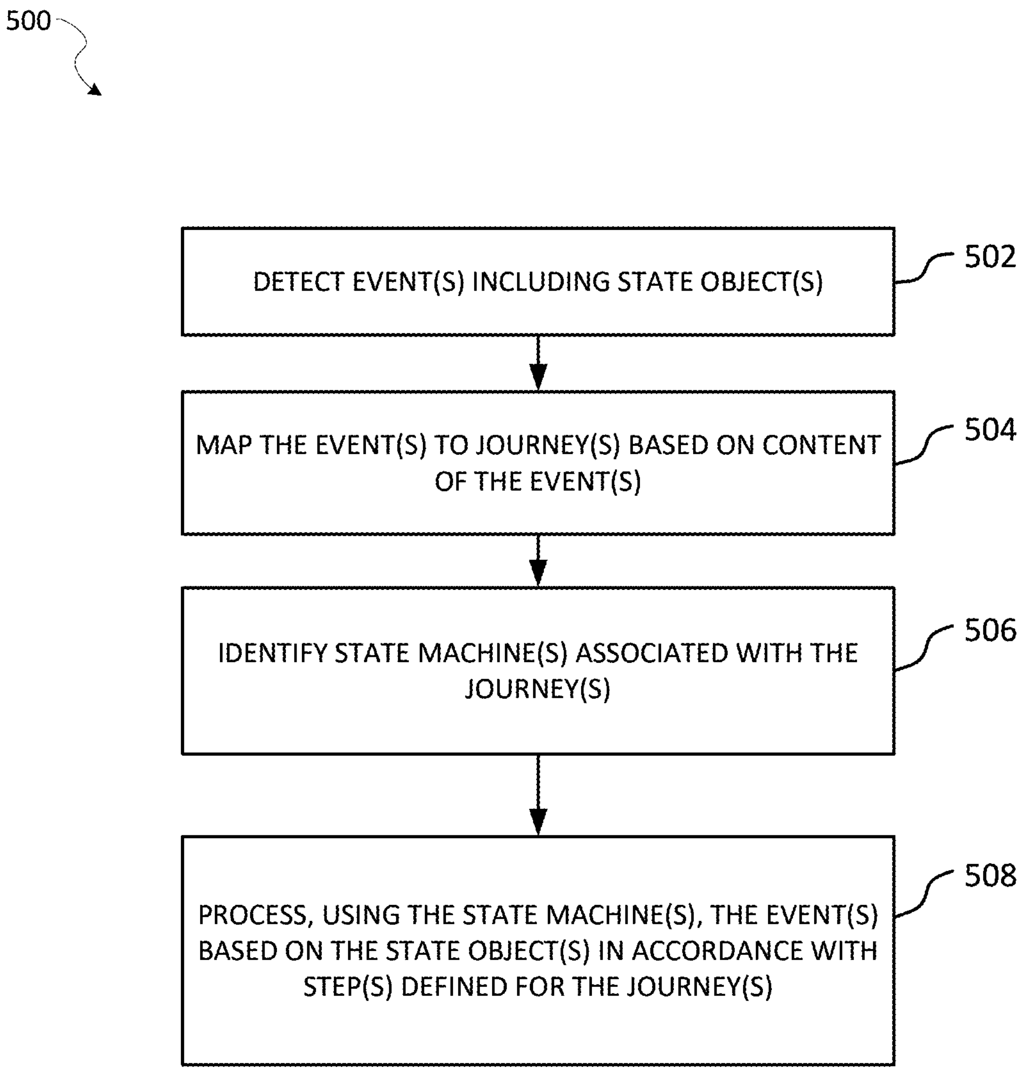
FIG. 5 is a flowchart illustrating an example method for facilitating the generation and management of communication workflows using event filters, according to various embodiments of the present disclosure.

FIG. 5 is a flowchart illustrating an example method 500 for facilitating the generation and management of communication workflows using event filters, according to various embodiments of the present disclosure. It will be understood that example methods described herein may be performed by a machine in accordance with some embodiments. For example, method 500 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 502, a processor detects one or more events. Each event can include (or be associated with) a state object that indicates a state of a user and/or a state of an action associated with a user. An event can be a system-generated event or a user-triggered event.

At operation 504, a processor uses one or more event filters to map one or more events to one or more communication workflows (also referred to as journeys) at least based on the content of the one or more events. The mapping of the one or more events includes determining that the content of the one or more events satisfies the definitions of the journeys.

At operation 506, a processor identifies one or more state machines associated with one or more journeys. A state machine can refer to a computational model that represents different states of complex systems and/or communication processes and the transitions between those states based on certain events or conditions. State machines can help manage communication workflows and provide a structured way to design, implement, and manage complex workflows by defining the possible states, the conditions triggering state transitions, and the actions to be taken in each state.

At operation 508, a processor uses one or more state machines to process one or more events (e.g., filtered events) based on the associated one or more state objects in accordance with one or more steps defined for one or more journeys.

Though not illustrated, method 500 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 502 through 508 or, alternatively, form part of one or more of operations 502 through 508.

Figure 6:
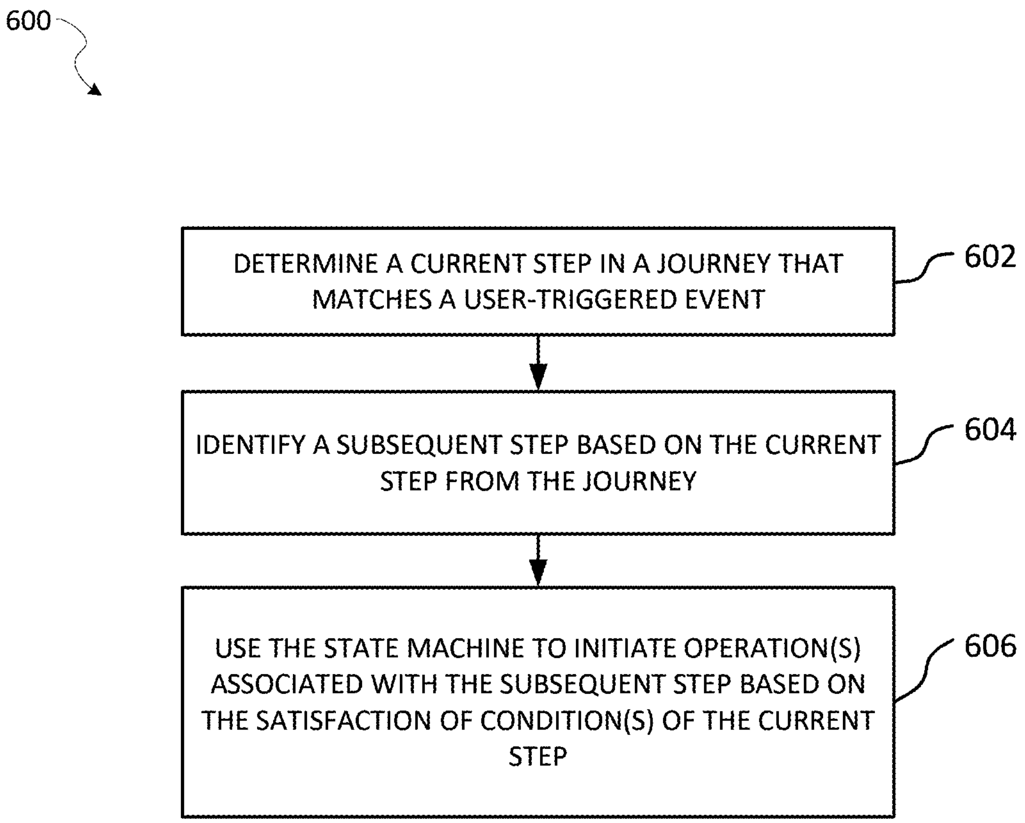
FIG. 6 is a flowchart illustrating an example method for facilitating the generation and management of communication workflows using event filters, according to various embodiments of the present disclosure.

FIG. 6 is a flowchart illustrating an example method 600 for facilitating the generation and management of communication workflows using event filters, according to various embodiments of the present disclosure. It will be understood that example methods described herein may be performed by a machine in accordance with some embodiments. For example, method 600 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 600 may be represented by executable instructions that, when executed by a processor of a computing device, cause the computing device to perform method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 602, a processor determines a current step in a journey that matches a user-triggered event.

At operation 604, a processor identifies a subsequent step from the journey based on the current step.

At operation 606, a processor uses one or more state machines to initiate one or more operations associated with the subsequent step based on the satisfaction of one or more conditions (and/or triggers) of the current step. The satisfaction of one or more conditions (and/or triggers) of the current step dictates how an entity progresses from the current step to the subsequent step.

In various embodiments, a user can define the conditions and/or events that trigger transitions that cause progression from one state to another handled by a state machine. For example, if a user is transitioned from a "pending" state to a "sending" state, a condition can be the user triggering the sending action. If there are time-dependent transitions (e.g., waiting for a response), timeouts may be configured to handle cases where the expected event fails to occur within a specified timeframe.

In various embodiments, the conditions and/or events can be determined based on the content of filtered events described herein. Filtered events can correspond to actions taken by users (e.g., user-triggered events) or by the system (s) (e.g., system-generated events).

In various embodiments, upon determining, based on the content of the event, that the event does not map to any definition of a journey associated with the entity, the processor generates a state machine based on the event. The generated state machine can model each step in one or more journeys to be configured by the entity and handle transitions from one step to another. The transitions can be handled by initiating one or more operations associated with a subsequent step based on the entity's current state.

Though not illustrated, method 600 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 602 through 606 or, alternatively, form part of one or more of operations 602 through 606.

Figure 7:
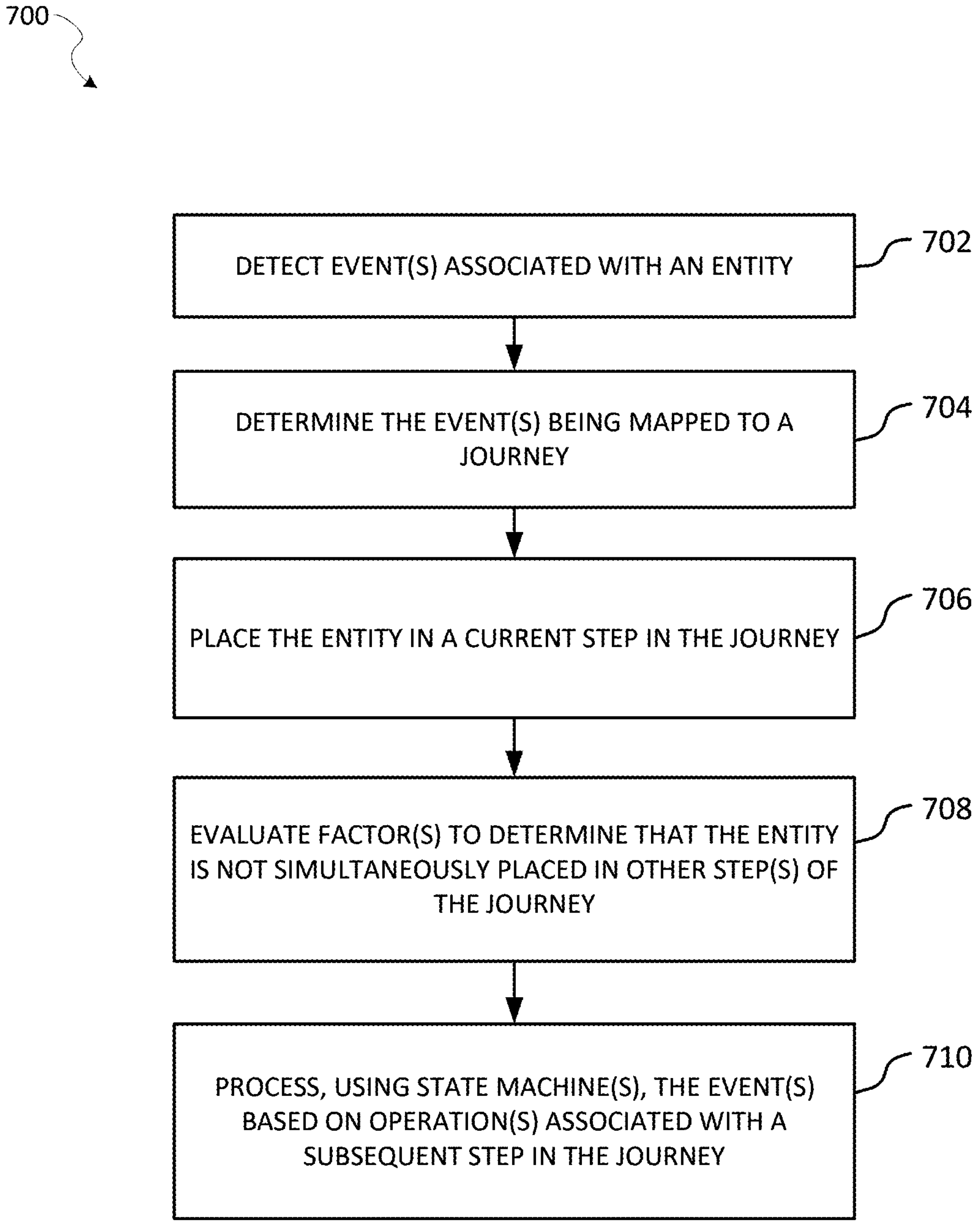
FIG. 7 is a flowchart illustrating an example method for facilitating the generation and management of communication workflows using profile state consistency, according to various embodiments of the present disclosure.

FIG. 7 is a flowchart illustrating an example method 700 for facilitating the generation and management of communication workflows using profile state consistency, according to various embodiments of the present disclosure. It will be understood that example methods described herein may be performed by a machine in accordance with some embodiments. For example, method 700 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 700 may be represented by executable instructions that, when executed by a processor of a computing device, cause the computing device to perform method 700. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 702, a processor detects one or more events associated with an entity (e.g., a user). Each event can include (or be associated with) a state object that indicates a state of a user and/or a state of an action associated with a user. An event can be a system-generated event or a user-triggered event.

At operation 704, a processor determines that the one or more events are mapped to one or more journeys. Each journey includes a plurality of steps configured by the entity.

At operation 706, a processor places the entity in a current step in the journey. The placing of the entity can include identifying a current step of the entity by matching the current step to a state object of an event (e.g., a filtered event).

At operation 708, a processor evaluates one or more factors to determine that the entity is not simultaneously placed in another step of the journey. One or more factors can correspond to one or more of, without limitation, the evaluation of memberships, setting of evaluation windows, setting of priorities, existing entities, moving of profiles, and support analytics.

At operation 710, in response to determining that the entity is not simultaneously placed in another step of the journey, a processor identifies a state machine associated with the journey and uses the state machine to process the event based on an operation associated with a step subsequent to the current step in the journey.

At operation 712, a processor updates a profile associated with the entity (e.g., a user) based on the processing of the one or more events.

Though not illustrated, method 700 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 702 through 712 or, alternatively, form part of one or more of operations 702 through 712.

Figure 8:
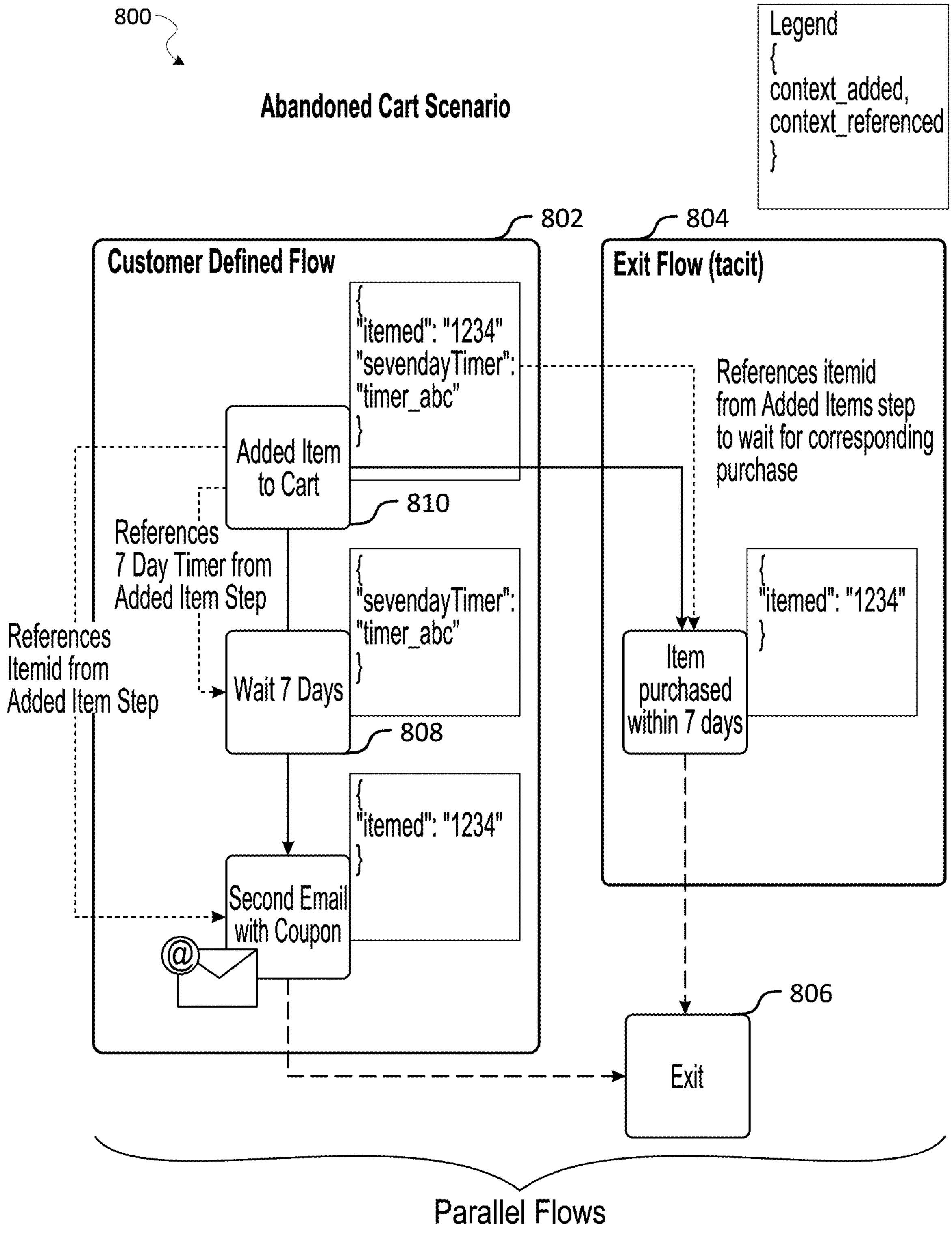
FIG. 8 is a block diagram illustrating an example tacit workflow in an abandoned cart scenario, according to various embodiments of the present disclosure.

FIG. 8 is a block diagram 800 illustrating an example tacit workflow in an abandoned cart scenario, according to various embodiments of the present disclosure. As shown, in a scenario involving an abandoned shopping cart, a journey includes a customer-defined workflow 802 and an exit workflow 804. The exit workflow 804 is an example of a tacit workflow. The exit workflow 804 is automatically generated (or initiated or activated) by a data management system (e.g., the data management system 122, 200) when an item "1234" is added to a shopping cart. The exit workflow 804 is simultaneously generated with the customer-defined workflow 802 to ensure the item "1234" in the shopping cart is purchased within a set timeframe (e.g., 7 days) while the main workflow (i.e., the customer-defined workflow 802) is waiting for the timeout duration to elapse. If the item is purchased within the set timeframe, the event of the purchase triggers an exit (e.g., step 806) from the associated customer-defined workflow 802, regardless of the user's current position in workflow 802. This illustrates how tacit workflows can influence the behavior of the journey without direct user interaction.

In various embodiments, customers can create customer-defined workflows using an editor, such as the What You See Is What You Get (WYSIWYG) editor. This editor allows the creation of flows through a visual interface that includes nodes and edges, representing different steps and the transitions between them. Unlike tacit workflows, customer-defined workflows are visible to the user and can be customized directly according to the user's needs.

Various embodiments allow a user to be in one step of the customer-defined workflow at any given epoch. However, for effective tracking and management of the overarching workflow (e.g., a journey), a user can be involved in multiple steps within the associated tacit workflows. This dual engagement in both customer-defined and tacit workflows ensures that the system can react to exceptional scenarios within the journey, such as a rescheduled appointment or an abandoned cart, without requiring manual intervention from the user.

As shown, a step, such as step 808 (Wait 7 days), is able to reference data points (e.g., contextual data, such as the 7-day timer) from another step (e.g., step 810) in the workflow. The data management system (e.g., the data management system 122, 200 manages the persistence of referenced data points, obviating the need of namespacing similarly named data from different steps.

In various embodiments, contextual data is stable for the duration of the workflow. Data can be explicitly mutated as step definitions call for it (Added Item to Cart in this case).

Workflows can have multiple timelines internally. In this case, the customer defined a timeline (on the left) using a WYSIWYG canvas to describe the sequence of events and actions to take on them (send a coupon after 7 days of inactivity in the cart). In parallel, we can create one or more concurrent workflows (e.g., tacit workflows) that realize the tacit behavior of the workflow. In the abandoned cart use case, the exit workflow and the customer-defined workflow are simultaneously generated (or activated) to ensure that if the item is purchased while the exit workflow is waiting for the timeout duration to elapse, regardless of which step the user is in at any point in time, the customer-defined workflow is terminated (or exited).

FIG. 9 is a block diagram 900 illustrating example tacit workflows in an appointment booking scenario, according to various embodiments of the present disclosure. As shown, in a scenario involving appointment booking, a journey includes a customer-defined workflow 902 and two tacit workflows, i.e., the reset workflow 904, and the exit workflow 906. Both the reset workflow 904 and the exit workflow 906 are automatically generated (or initiated or activated) by a data management system (e.g., the data management system 122, 200) when an appointment is booked.

The customer-defined workflow 902, the reset workflow 904, and the exit workflow 906 are processed concurrently (or in parallel). An exit from the exit workflow 906 causes the termination of the customer-defined workflow 902.

In various embodiments, a rescheduling event both resets the state of the customer-defined workflow 902 and becomes the input of the customer-defined workflow going forward. For example, if an appointment is rescheduled from April 30th to May 5th, the underlying plumbing (e.g., timers) for April 29th (1 day before April 30th) is discarded (or torn down) before restarting the flow for May 5th with similar resources set up for a May 4th email.

In various embodiments, the runtime is able to apply the same event to multiple steps in the event processing loop. In the rescheduling use case, if the rescheduling event is determined to be the same as the scheduling event except for the change of the duration to remind before an appointment, the event may be applied from the reset workflow into the customer-defined workflow, capturing the updated duration (d1aseconds) and using that in the customer-defined workflow as if it was the event initiating it afresh.

In various embodiments, the system is able to call out to external systems (e.g., a Reference Data Service 908) and augment the contextual data passed between steps in a workflow. As shown in FIG. 9, the template interpolation syntax 910 (${appointment.a1.doctor.name}) is used to signal the fact that the name of the doctor associated with the appointment should be fetched from the system of record for subsequent use in an email template.

Figure 10:
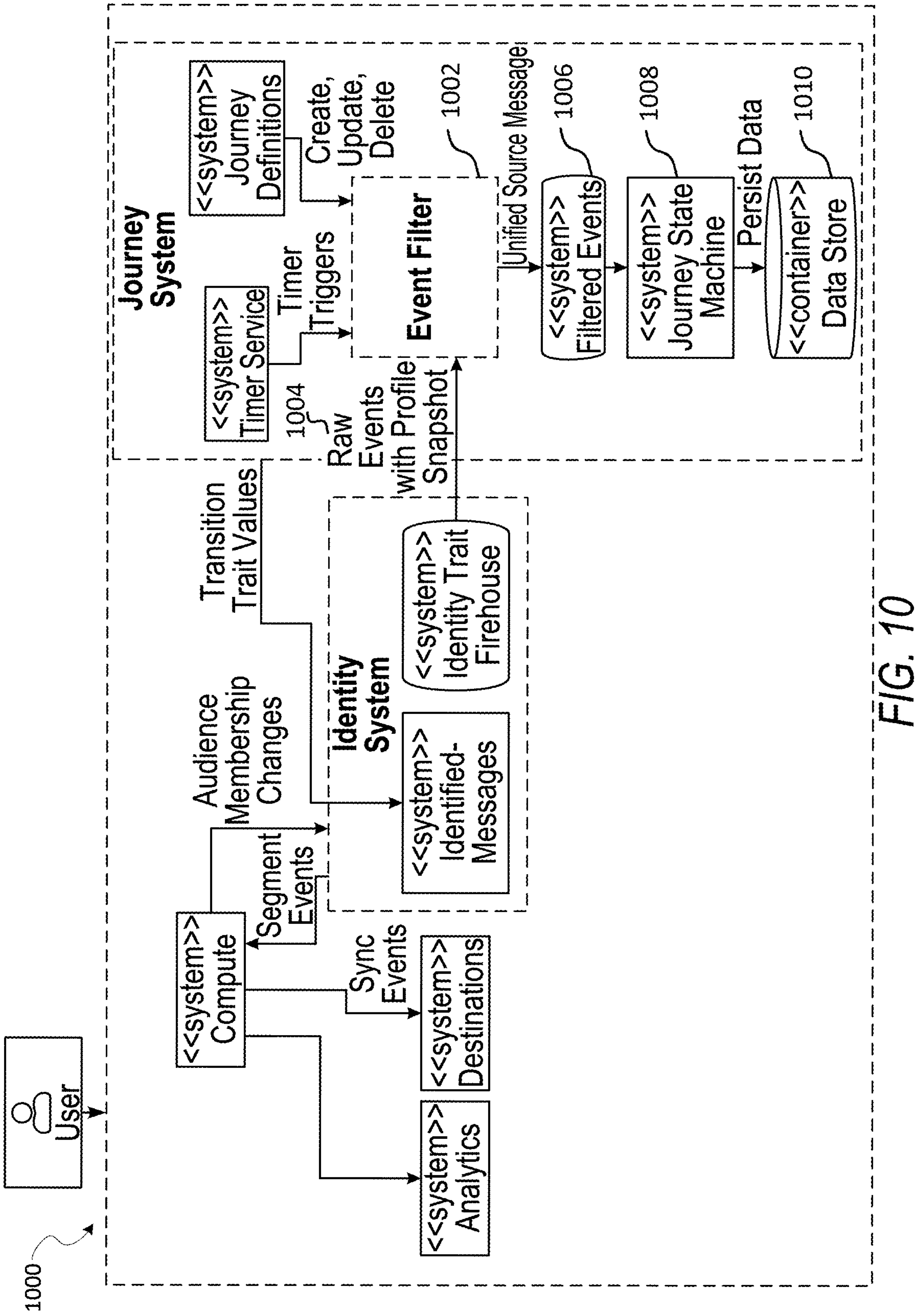
FIG. 10 is a block diagram illustrating an example data system for facilitating the generation and management of communication workflows using profile state consistency, according to various embodiments of the present disclosure.

FIG. 10 is a block diagram illustrating an example data system 1000 facilitating the generation and management of communication workflows using profile state consistency, according to various embodiments of the present disclosure. Event filter 1002 bridges between the journey system and input sources. The journey system can be a subsystem of the data management system described here. Event filter 1002 filters incoming messages (e.g., raw events 1004) based on active computations and relays the filtered incoming messages (e.g., filtered events 1006) to the corresponding state machines 1008 for processing. The filtered events received from the stream of filtered events 1006 can result in one of the following scenarios:

Enter a new journey: If the match (or mapping) is on the entry step for a journey and no epoch is generated, the data management system can create an epoch for the journey based on the event data (e.g., the data content of the event).

Transition to new steps in a journey the user has already entered: If the match (or mapping) is on non-entry steps for a journey, and the epoch for the journey has the matching step as one of the next steps (e.g., subsequent steps), the data management system can apply the event data to the epoch on the journey.

No valid transitions: The event is ignored, discarded, or passed to another system if neither of the above checks succeeds.

Data store 1010 can be a low-latency key-value store that stores various data described herein, including event, epoch, and profile data.

Figure 11:
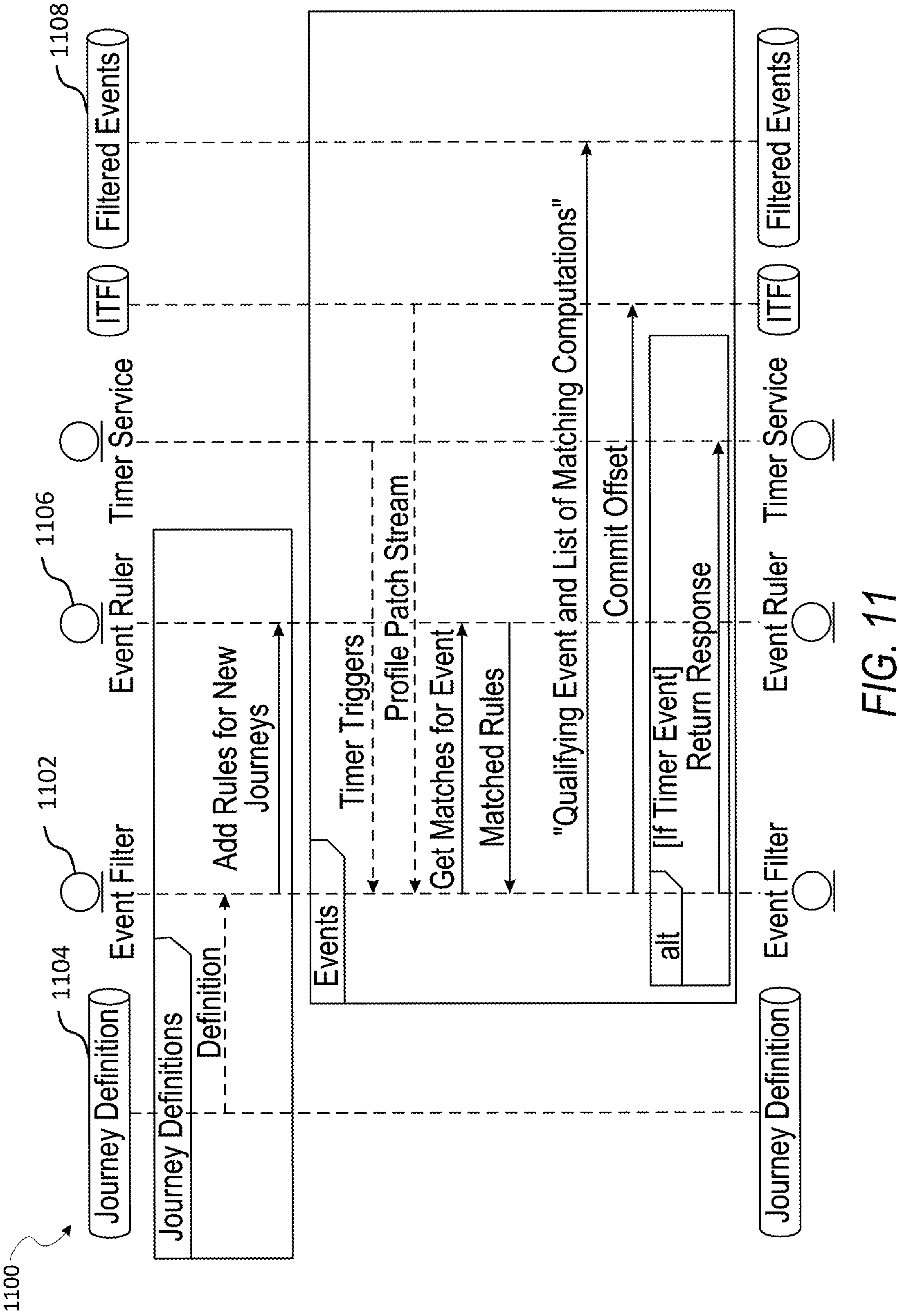
FIG. 11 is a sequence diagram illustrating an example data flow for facilitating the generation and management of communication workflows using an event filter, according to various embodiments of the present disclosure.

FIG. 11 is a sequence diagram illustrating an example data flow 1100 for facilitating the generation and management of communication workflows using an event filter, according to various embodiments of the present disclosure. As shown, event filter 1102 filters incoming messages (or raw events) based on journey definition 1104 and relays the qualified events (also referred to as filtered events 1108) to the corresponding state machines (not shown) for downstream processing.

In various embodiments, in order to map an event to a journey based on the content of the event, the data management system can use a software library (e.g., event ruler 1106) to match a plurality of rules against the content of the event. The plurality of rules can be user-defined rules. The event ruler 1106 can be a component or an external tool used by the event filter 1102 to perform the relevant operations described herein. The event ruler 1106 allows users to build applications that match a number of rules against events at a high processing speed. Both events and rules can be JSON objects. Rules can additionally be expressed through an inbuilt query language that describes custom matching patterns.

Figure 12:
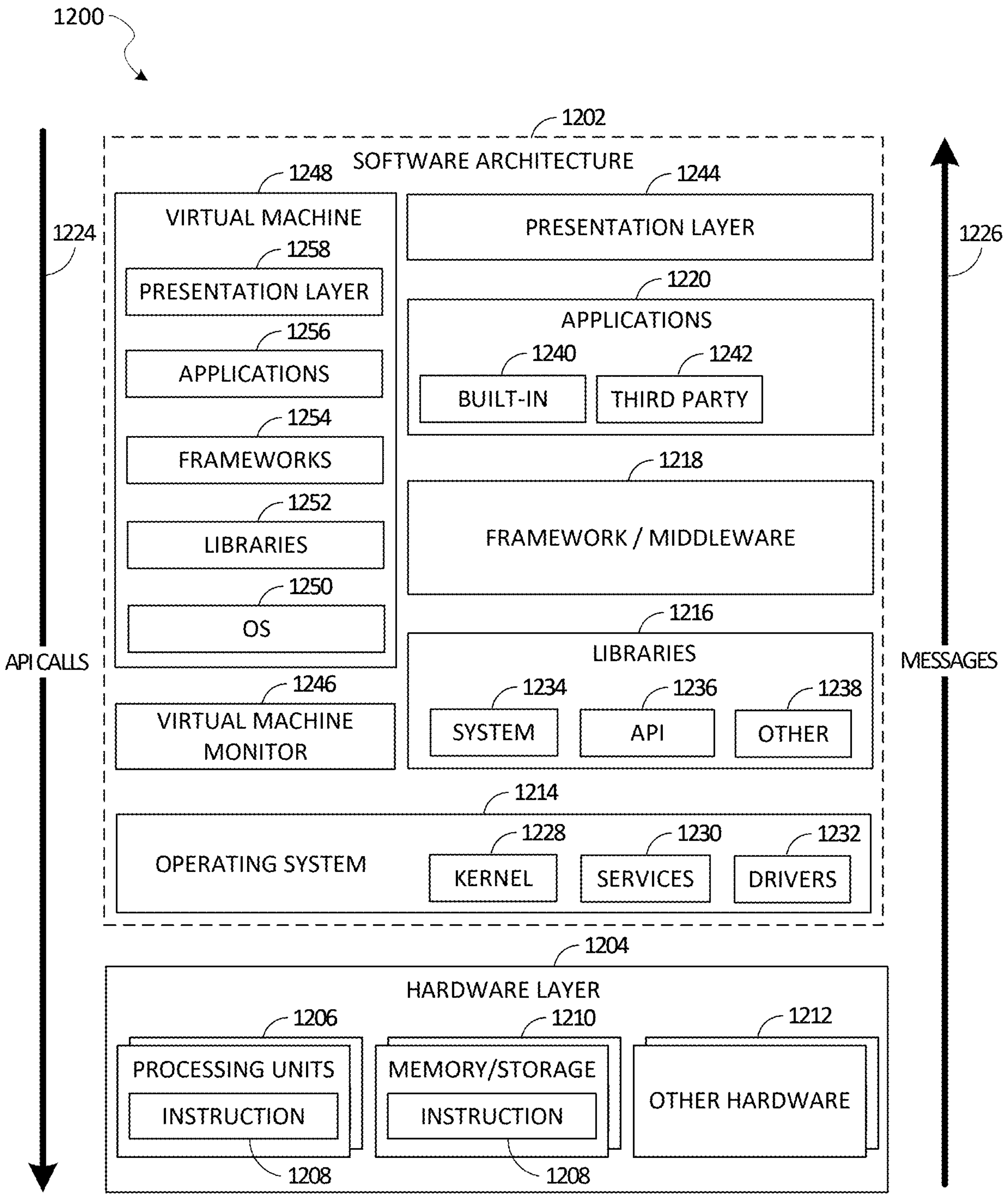
FIG. 12 is a block diagram illustrating a representative software architecture, which may be used in conjunction with various hardware architectures herein described, according to various embodiments of the present disclosure.

FIG. 12 is a block diagram 1200 illustrating an example of a software architecture 1202 that may be installed on a machine, according to some example embodiments. FIG. 12 is merely a non-limiting example of a software architecture, and it will be appreciated that many other architectures may be implemented to facilitate the functionality described herein. The software architecture 1202 may be executing on hardware such as a machine 1300 of FIG. 13 that includes, among other things, processors 1310, memory 1330, and input/output (I/O) components 1350. A representative hardware layer 1304 is illustrated and can represent, for example, the machine 1300 of FIG. 13. The representative hardware layer 1204 comprises one or more processing units 1206 having associated executable instructions 1208. The executable instructions 1208 represent the executable instructions of the software architecture 1202. The hardware layer 1204 also includes memory or storage modules 1210, which also have the executable instructions 1208. The hardware layer 1204 may also comprise other hardware 1212, which represents any other hardware of the hardware layer 1204, such as the other hardware illustrated as part of the machine 1200.

In the example architecture of FIG. 12, the software architecture 1202 may be conceptualized as a stack of layers, where each layer provides particular functionality. For example, the software architecture 1202 may include layers such as an operating system 1214, libraries 1216, frameworks/middleware 1218, applications 1220, and a presentation layer 1244. Operationally, the applications 1220 or other components within the layers may invoke API calls 1224 through the software stack and receive a response, returned values, and so forth (illustrated as messages 1226) in response to the API calls 1224. The layers illustrated are representative in nature, and not all software architectures have all layers. For example, some mobile or special-purpose operating systems may not provide a frameworks/middleware 1218 layer, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 or other software components/modules. For example, the frameworks 1218 may provide various graphical user interface functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a home application, a contacts application, a browser application, a book reader application, a location application, a media application, a messaging application, or a game application.

The third-party applications 1242 may include any of the built-in applications 1240, as well as a broad assortment of other applications. In a specific example, the third-party applications 1242 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party application 1242 may invoke the API calls 1224 provided by the mobile operating system, such as the operating system 1214, to facilitate the functionality described herein.

The applications 1220 may utilize built-in operating system functions (e.g., kernel 1228, services 1230, or drivers 1232), libraries (e.g., system libraries 1234, API libraries 1236, and other libraries 1238), or frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with the user.

Some software architectures utilize virtual machines. In the example of FIG. 12, this is illustrated by a virtual machine 1248. The virtual machine 1248 creates a software environment where applications/modules can execute as if they were executing on a hardware machine (e.g., the machine 1200 of FIG. 12). The virtual machine 1248 is hosted by a host operating system (e.g., the operating system 1214) and typically, although not always, has a virtual machine monitor 1246, which manages the operation of the virtual machine 1248 as well as the interface with the host operating system (e.g., the operating system 1214). A software architecture executes within the virtual machine 1248, such as an operating system 1250, libraries 1252, frameworks/middleware 1254, applications 1256, or a presentation layer 1258. These layers of software architecture executing within the virtual machine 748 can be the same as corresponding layers previously described or may be different.

Figure 13:
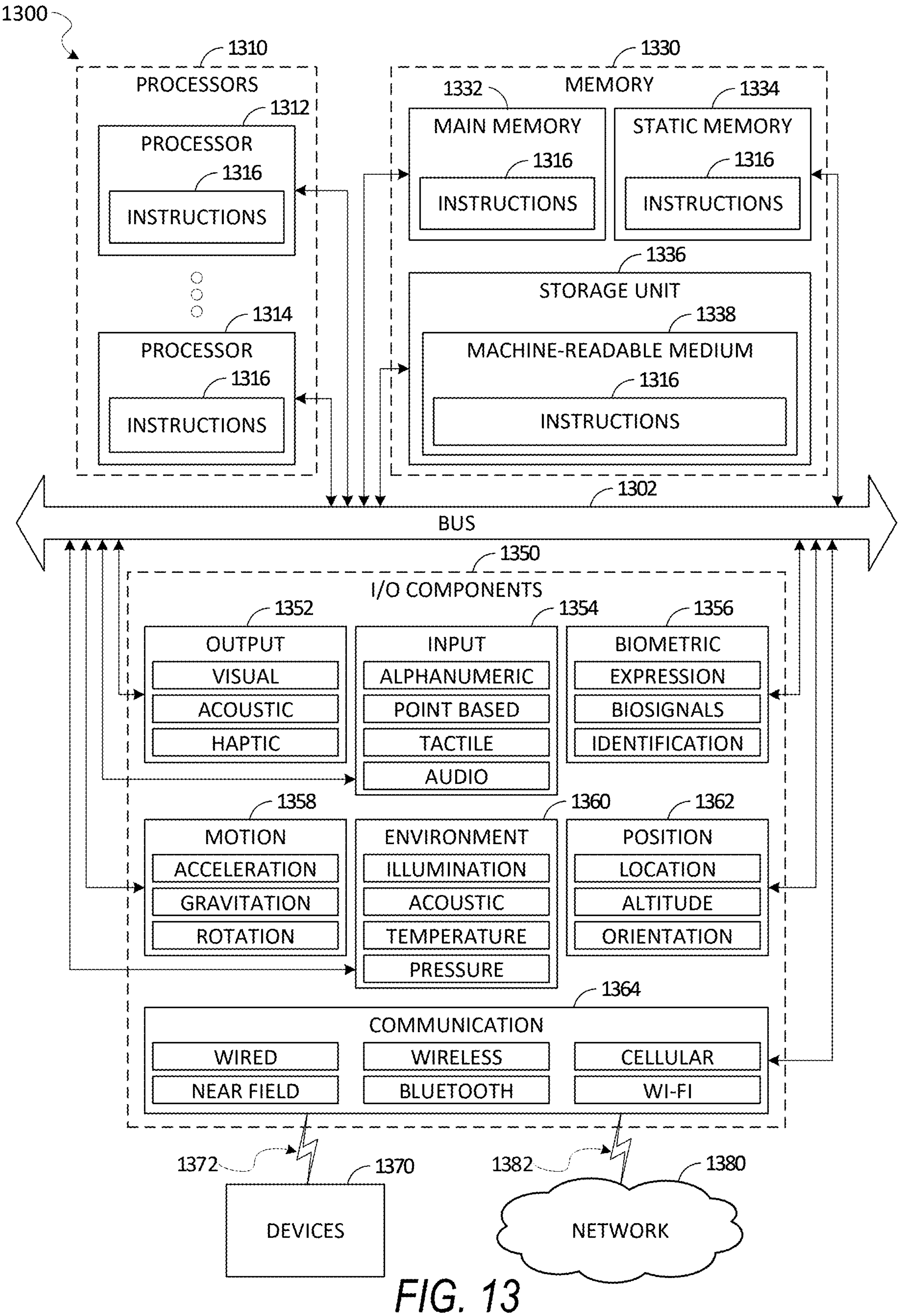
FIG. 13 is a block diagram illustrating components of a machine able to read instructions from a machine storage medium and perform any one or more of the methodologies discussed herein according to various embodiments of the present disclosure.

FIG. 13 illustrates a diagrammatic representation of a machine 1300 in the form of a computer system within which a set of instructions may be executed for causing the machine 1300 to perform any one or more of the methodologies discussed herein, according to an embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute the method 300 described above with respect to FIG. 3, the method 400 described above with respect to FIG. 4, and the method 500 described above with respect to FIG. 5. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an embodiment, the processors 1310 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors that may comprise two or more independent processors (sometimes referred to as "cores") that may execute instructions contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory 1330 may include a main memory 1332, a static memory 1334, and a storage unit 1336 including machine-readable medium 1338, each accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion, and the grouping is in no way limiting. In various embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1350 may include biometric components 1356, motion components 1358, environmental components 1360, or position components 1362, among a wide array of other components. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1362 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 1300, but deployed across a number of machines 1300. In some example embodiments, the processors 1310 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 1330, 1332, 1334, and/or the memory of the processor(s) 1310) and/or the storage unit 1336 may store one or more sets of instructions 1316 and data structures (e.g., software) embodying or utilized by any one or more of the methodologies or functions described herein. These instructions (e.g., the instructions 1316), when executed by the processor(s) 1310, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1316 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 1380 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

detecting a first event associated with an entity;

mapping the first event to a customer-defined workflow in a journey based on content of the first event;

in response to the first event satisfying a first condition associated with the customer-defined workflow, activating the customer-defined workflow and generating a tacit workflow in the journey based on the mapping of the event, the tacit workflow being a system-generated workflow configured by a setting of the customer-defined workflow to execute at least partially concurrently with the customer-defined workflow within the journey, the tacit workflow including one or more steps configured based on a setting associated with the customer-defined workflow;

processing, using a state machine associated with the journey, the customer-defined workflow and the tacit workflow in accordance with the one or more steps at least partially concurrently;

detecting a second event associated with the entity;

mapping the second event to the tacit workflow based on content of the second event; and in response to the mapping of the second event, processing, by the state machine, the second event in accordance with the tacit workflow to modify a state of the customer-defined workflow regardless of a current step in the customer-defined workflow.

2. The method of claim 1, wherein the customer-defined workflow runs at least partially concurrently with the tacit workflow, wherein the customer-defined workflow is configured by the entity, and wherein the tacit workflow is automatically generated based on the setting of the customer-defined workflow.

3. The method of claim 1, wherein the first event comprises contextual data that can be referenced by one or more steps in the customer-defined workflow and by one or more steps in the tacit workflow.

4. The method of claim 1, comprising:

determining that the content of the first event satisfies a definition of the journey; and in response to determining that the content of the first event satisfies the definition of the journey, mapping the first event to the customer-defined workflow in the journey.

5. The method of claim 1, comprising:

identifying contextual data based on the first event, the contextual data at least including an item identifier; and generating the tacit workflow based on the item identifier included in the contextual data.

6. The method of claim 1, comprising:

determining that the first event does not correspond to a rescheduling event; and in response to determining that the first event is not the rescheduling event, generating the tacit workflow in the journey based on the mapping of the first event.

7. The method of claim 6, wherein the tacit workflow comprises an exit workflow.

8. The method of claim 1, wherein the first event corresponds to an appointment booking event, and the second event corresponds to a rescheduling event, the method further comprising:

generating a second tacit workflow in the journey based on the mapping of the second event, the second tacit workflow comprising a reset workflow that is configured based on the setting of the customer-defined workflow.

9. The method of claim 8, comprising:

processing the first tacit workflow, the second tacit workflow, and the customer-defined workflow at least partially concurrently in the journey.

10. The method of claim 8, comprising:

updating one or more steps in the customer-defined workflow based on the second event that corresponds to the rescheduling event.

11. A system comprising:

one or more hardware processors; and a non-transitory machine-readable medium for storing instructions that, when executed by the one or more hardware processors, cause the one or more hardware processors to perform operations comprising:

detecting a first event associated with an entity;

mapping the first event to a customer-defined workflow in a journey based on content of the first event;

in response to the first event satisfying a first condition associated with the customer-defined workflow, activating the customer-defined workflow and generating a tacit workflow in the journey based on the mapping of the event, the tacit workflow being a system-generated workflow configured by a setting of the customer-defined workflow to execute at least partially concurrently with the customer-defined workflow within the journey, the tacit workflow including one or more steps configured based on a setting associated with the customer-defined workflow;

processing, using a state machine associated with the journey, the customer-defined workflow and the tacit workflow in accordance with the one or more steps at least partially concurrently;

detecting a second event associated with the entity;

mapping the second event to the tacit workflow based on content of the second event; and in response to the mapping of the second event, processing, by the state machine, the second event in accordance with the tacit workflow to modify a state of the customer-defined workflow regardless of a current step in the customer-defined workflow.

12. The system of claim 11, wherein the customer-defined workflow runs at least partially concurrently with the tacit workflow, wherein the customer-defined workflow is configured by the entity, and wherein the tacit workflow is automatically generated based on the setting of the customer-defined workflow.

13. The system of claim 11, wherein the first event comprises contextual data that can be referenced by one or more steps in the customer-defined workflow and by one or more steps in the tacit workflow.

14. The system of claim 11, wherein the operations comprise:

determining that the content of the first event satisfies a definition of the journey; and in response to determining that the content of the first event satisfies the definition of the journey, mapping the first event to the customer-defined workflow in the journey.

15. The system of claim 11, wherein the operations comprise:

identifying contextual data based on the first event, the contextual data at least including an item identifier; and generating the tacit workflow based on the item identifier included in the contextual data.

16. The system of claim 11, wherein the operations comprise:

determining that the first event does not correspond to a rescheduling event; and in response to determining that the first event is not the rescheduling event, generating the tacit workflow in the journey based on the mapping of the first event, the tacit workflow comprising an exit workflow.

17. The system of claim 11, wherein the first event corresponds to an appointment booking event, and the second event corresponds to a rescheduling event, and wherein the operations comprise:

generating a second tacit workflow in the journey based on the mapping of the second event, the second tacit workflow comprising a reset workflow that is configured based on the setting of the customer-defined workflow.

18. The system of claim 17, wherein the operations comprise:

processing the first tacit workflow, the second tacit workflow, and the customer-defined workflow at least partially concurrently in the journey.

19. The system of claim 17, wherein the operations comprise:

updating one or more steps in the customer-defined workflow based on the second event that corresponds to the rescheduling event.

20. A non-transitory machine-readable medium for storing instructions that, when executed by one or more hardware processors, cause the one or more hardware processors to perform operations comprising:

detecting a first event associated with an entity;

mapping the first event to a customer-defined workflow in a journey based on content of the first event;

in response to the first event satisfying a first condition associated with the customer-defined workflow, activating the customer-defined workflow and generating a tacit workflow in the journey based on the mapping of the event, the tacit workflow being a system-generated workflow configured by a setting of the customer-defined workflow to execute at least partially concurrently with the customer-defined workflow within the journey, the tacit workflow including one or more steps configured based on a setting associated with the customer-defined workflow;

processing, using a state machine associated with the journey, the customer-defined workflow and the tacit workflow in accordance with the one or more steps at least partially concurrently;

detecting a second event associated with the entity;

mapping the second event to the tacit workflow based on content of the second event; and in response to the mapping of the second event, processing, by the state machine, the second event in accordance with the tacit workflow to modify a state of the customer-defined workflow regardless of a current step in the customer-defined workflow.

* * * * *